Figures 1, 2:
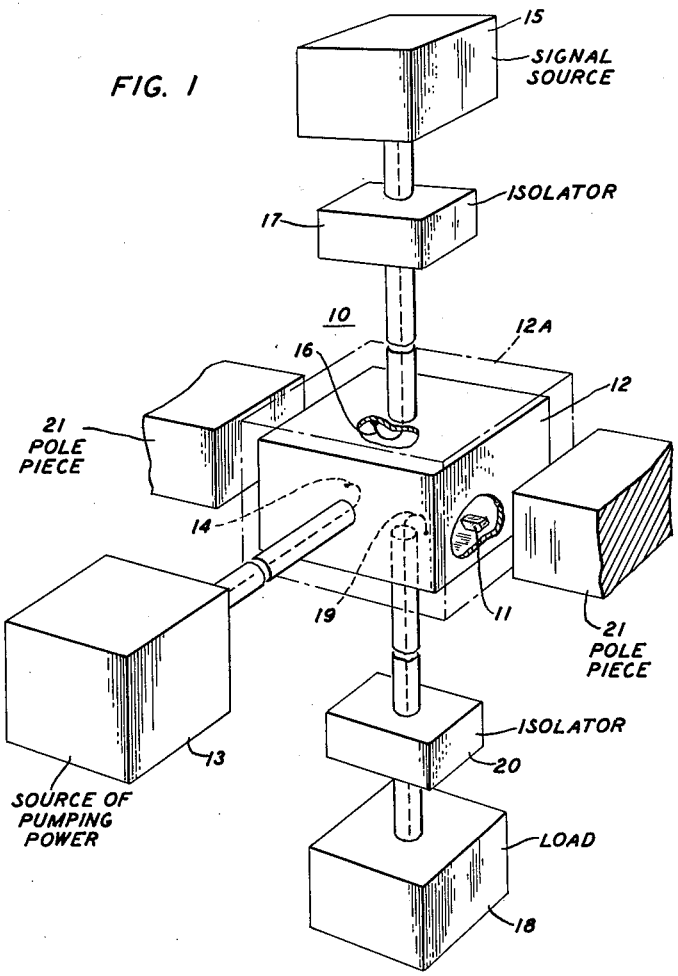

INVENTORS R. C. FLETCHER
H. E. D. SCOVIL
H. SEIDEL
BY
ATTORNEY

# United States Patent Office 3,001,141
Patented Sept. 19, 1961

3,001,141
SOLID STATE MASER AMPLIFIER
Robert C. Fletcher, Summit, Henry E. D. Scovil, New Vernon, and Harold Seidel, Fanwood, N.J., assignors to Bell Telephone Laboratories, Incorporated, New York, N.Y., a corporation of New York
Filed July 15, 1958, Ser. No. 709,143
5 Claims. (Cl. 330—4)

This invention relates to a solid state amplifier and more particularly to such an amplifier which makes use of stimulated emission of radiation. Amplifiers of this kind have been described as "masers" by workers in the art.

It is characteristic of a maser that it employs a medium in which there is established at least intermittently a nonequilibrium population distribution in a pair of spaced energy levels of its energy level system. In particular, the population of the higher of the selected pair of energy levels of its energy level system is made larger than that of the lower. It is now usual to describe a medium which is in such an inverted state as exhibiting a negative temperature with respect to such two levels. It is characteristic that if there be applied to a medium which is in a negative temperature state a signal of a frequency $f$ which satisfies the Bohr frequency condition with respect to the two energy levels $E_1$, $E_2$ which are in nonequilibrium, $$f = \frac{E_2 - E_1}{h}$$

where $h$ is Planck's constant), then the applied signal will stimulate the emission of radiation at the signal frequency from the medium and the signal will be amplified.

Various techniques have been proposed hitherto for achieving a desired population inversion or negative temperature between a pair of energy levels whereby amplification of a signal of appropriate frequency may be obtained. A paper entitled, "Molecular Amplification and Generation of Microwaves," Proceedings of the I.R.E., volume 45, pages 291–316, reviews many of the techniques known hitherto.

The present invention relates to an improved technique for the maintenance continuously of a negative temperature in the medium whereby a continuous wave may be amplified. Moreover, by this technique the negative temperature state is maintained by the application of pumping power of frequency not significantly greater and in some embodiments even less than that of the signal frequency.

It is in accordance with the invention to employ a paramagnetic medium whose population of electron spins is capable of at least four discrete energy levels of successively higher energies to be designated $E_1$, $E_2$, $E_3$ and $E_4$, respectively. The separations between levels $E_1$ and $E_2$ and between $E_3$ and $E_4$ are each made to correspond to frequencies in a useful operating range, typically the microwave range. Moreover, in one embodiment the medium is adapted so that the electron spins have a spin lattice relaxation time $T_{24}$ between levels $E_2$ and $E_4$ which is much shorter than the spin lattice relaxation time $T_{14}$ between levels $E_1$ and $E_4$. To this end, there is incorporated in the medium paramagnetic impurities which reduce selectively the spin lattice relaxation time $T_{24}$. In another embodiment, the medium is adapted so that the electron spins have a spin lattice relaxation time between levels $E_3$ and $E_1$ which is much less than that between levels $E_3$ and $E_2$. Again, paramagnetic impurities are included in the medium to promote this state. To a medium of the kind described, typically there is applied pumping power of the frequency corresponding to the separation between levels $E_3$ and $E_4$ to saturate the level $E_4$ and substantially to equalize the spin populations of levels $E_3$ and $E_4$. If the spin population of level $E_4$ be increased sufficiently, the spin population of level $E_2$ may be made to exceed that of level $E_1$, whereby the medium is adapted to amplify by stimulated emission signal power of the frequency corresponding to the separation between levels $E_1$ and $E_2$. Alternatively, pumping power of the frequency corresponding to the separation between levels $E_1$ and $E_2$ may be used to establish a negative temperature betweens levels $E_3$ and $E_4$ and amplification thereby made possible at the frequency corresponding to the separation of the latter two levels. By appropriate control of the separations between levels $E_1$ and $E_2$ and between levels $E_3$ and $E_4$, the frequency at which amplification is possible may be made close to and even higher than the frequency of the pumping power. Typically, in an embodiment of the invention, a medium of the kind described is housed in a cavity resonant both at the pumping frequency and the signal frequency. Alternatively, the medium may be positioned along a distributed transmission line to which either or both the pumping power and signal power are applied for travel therealong over an extended region of the transmission line, for example, in the manner described in copending application Serial No. 631,643, filed December 31, 1956, by H. Seidel (case 7).

The invention will be better understood from the following more detailed description, taken in conjunction with the accompanying drawing, in which:

FIG. 1 shows an illustrative form of a solid state maser in accordance with the invention; and FIG. 2 is an energy level diagram of a paramagnetic medium of the kind suited for use in the maser shown in FIG. 1.

With reference now to the drawing, the maser 10 comprises a cavity 11 which is resonant at a pair of frequencies, one of which corresponds to the pumping frequency and the other the signal frequency. The cavity houses the paramagnetic medium 12 whose composition is discussed in detail below. It is advantageous generally to keep the medium at a low temperature, for example, close to that of liquid helium, and typically the cavity is enclosed within suitable refrigerating apparatus which has not been shown in the interest of simplicity.

Pumping power of appropriate frequency is supplied to the cavity resonator from a local oscillator 13 by way of a coupling loop 14 in the manner known to workers in the art for exciting the corresponding resonant mode of the cavity resonator.

Input signal power is applied to the cavity resonator from a source 15 by way of a coupling loop 16. It is advantageous to include an isolator 17 in the signal path intermediate the input signal source and cavity resonator to minimize the transfer of power from the cavity resonator toward the source.

Output signal power is abstracted from the cavity resonator for utilization by the load 18, which in some instances may be another maser, by way of coupling loop 19. It is similarly advantageous to include an isolator 20 along the signal path intermediate the load and cavity resonator to minimize the reflection of power from the load back into the cavity resonator. Such isolator, too, advantageously is maintained at a low temperature in the interest of low noise. Each of these two loops is arranged to couple to the cavity mode resonant at the signal frequency in the manner known to workers in the art.

Alternatively, it is feasible to utilize only a single signal coupling loop to the cavity which leads to one arm of a circulator, other arms of which are connected to the signal source and the load, respectively, in a manner that will be evident to workers in the art. Similarly, only a single signal output coupling loop is necessary if the maser is employed as an oscillator. In such operation, noise typically arising in the walls of the resonant cavity serves to stimulate from the medium the emission of radiation which gives rise to oscillations.

Typically, the paramagnetic medium 12 will comprise a composite crystalline solid which includes an active paramagnetic salt and a doping paramagnetic salt, both diluted in the lattice structure of an isomorphous diamagnetic salt. Such dilution is useful to minimize the magnetic dipole-dipole interaction between neighboring paramagnetic ions by increasing the separation therebetween. Such interaction broadens the width of the energy levels and accordingly must not be allowed to become excessive since the amount of pumping power needed for saturation is related to the widths of the energy levels, and, accordingly, too wide energy levels increase undesirably the amount of pumping power necessary. However, the bandwidth over which amplification is obtainable similarly is related directly to the widths of the energy levels so that some compromise is necessary.

Typically, there is applied to the crystalline solid a steady magnetic field which produces Zeeman splitting of the energies of the electron spin population of the active paramagnetic salt to produce at least the desired four energy levels $E_1$, $E_2$, $E_3$ and $E_4$ in the energy diagram of the active salt. FIG. 2 shows a schematic energy diagram for an active salt of this kind.

As is known to workers in the art, the degree of separation in energy levels produced by the magnetic field can be controlled by the strength of the magnetic field and the relative orientations of the magnetic field and the crystalline axis of the paramagnetic salt.

To provide the desired Zeeman splitting, pole pieces 21 are provided on opposite sides of the cavity for establishing a suitable magnetic flux in the medium 12.

It is in accordance with the present invention to apply pumping power of the frequency corresponding to the separation of levels $E_3$ and $E_4$ for establishing in the medium a negative temperature at the frequency corresponding to the separation between levels $E_1$ and $E_2$. To this end, it is important to control in an appropriate manner the spin lattice relaxation times between various energy levels. In particular, it is important that either the spin lattice relaxation time between levels $E_2$ and $E_4$ be much shorter than that between levels $E_1$ and $E_4$ or that between levels $E_1$ and $E_3$ be much shorter than that between levels $E_2$ and $E_3$. Under the first set of conditions when the pumping power tends to equalize the populations of levels $E_3$ and $E_4$ by decreasing the population of level $E_3$ and increasing that of level $E_4$, the population of level $E_2$ will tend more toward Boltzmann equilibrium with respect to that of level $E_4$ than will that of level $E_1$. If the increase in population over its Boltzmann equilibrium value is made sufficiently large, the population of level $E_2$ can be made to exceed that of level $E_1$ and the desired negative temperature results. Under the alternative set of conditions, the population of level $E_1$ tends strongly to take up Boltzmann equilibrium with level $E_3$ and become decreased as the population of level $E_3$ is decreased. When this decrease is sufficient, the desired negative temperature is established between levels $E_1$ and $E_2$. It is, of course, feasible to use the two effects described in a cumulative fashion to increase the population of level $E_2$ and to decrease the population of level $E_1$ simultaneously for achieving the desired negative temperature.

To achieve either of the desired relations between spin lattice relaxation times, it is important to include in the lattice structure of the crystalline medium 12 a doping paramagnetic salt whose energy level system is suitably related to the energy level system of the active paramagnetic salt. In particular, the doping paramagnetic salt is chosen to have under the operating conditions a pair of energy levels whose separation is substantially equal to the separation between the two levels of the four levels of the active paramagnetic salt between which the spin lattice relaxation times is desired to be short. In particular, it is advantageous, although unnecessary, that the spin lattice relaxation time between the two levels of the doping salt be shorter than the spin lattice relaxation time of the corresponding two levels of the active salt. It is also important that the doping salt be operated not to have a pair of levels whose separation substantially equals the separation of the pair of levels whose spin lattice relaxation times are desirably long. By the inclusion of the doping salt, the desired decrease in relaxation time of the transitions between two levels of the active salt is achieved by reason of a spin-spin interaction mechanism. The theory explaining the reduction in spin lattice relaxation time of the transistions between a selected pair of energy levels by this mechanism is discussed in more detail in copending application Serial No. 625,548, filed November 30, 1956, by H. E. D. Scovil.

A paramagnetic crystalline medium medium suitable for use in the manner described typically might comprise over 99 percent lanthanum ethyl sulphate, which serves as the diamagnetic diluent, about one-half of one percent gadolinium ethyl sulphate, which serves as the active paramagnetic salt, and about two-tenths of one percent erbium ethyl sulphate, which serves as the doping paramagnetic salt. The static magnetic field is applied to such a crystal in a direction to the crystalline axis and with such strength that operation in the manner described is made possible at the desired operating signal frequency. To a considerable extent the preferred orientation is adjusted empirically. For the particular medium described, it is desirable that the applied magnetic field be substantially parallel to the magnetic field of the pumping power and substantially perpendicular to the magnetic field of the signal power. This end is achieved by choosing a cavity whose two resonant modes are suitably oriented and by the use of appropriate orientation of the cavity coupling connections.

Alternatively, it is feasible in the maser described to employ pumping power of the frequency corresponding to the separations of levels $E_1$ and $E_2$ and signal power of the frequency corresponding to the separations of levels $E_3$ and $E_4$.

It will be obvious to a worker in the art that various other combinations of paramagnetic materials along with a diamagnetic diluent may be incorporated in a crystalline medium for use in accordance with the principles of the invention set forth. In some instances, it may be possible to employ paramagnetic materials which exhibit Zeeman splitting even in the absence of an applied static magnetic field.

It will be obvious further to a worker skilled in the art that various modifications may be provided to the basic form of solid state maser depicted. For example, a distributed wave circuit may be used instead of a cavity, as was mentioned above. Alternatively, various other techniques may be devised for abstracting useful signal information from the medium.

In this regard, it is known that the Faraday rotation of light through a paramagnetic medium depends upon the susceptibility of the ground state of the medium and that accordingly changing the population of the ground state will affect the Faraday rotation. Accordingly, changes in the population of the ground state due to stimulated emission under the influence of an applied microwave input signal may be used to vary the Faraday rotation of light through the medium and such changes in Faraday rotation used to modulate a beam of light which is transmitted through the medium. Typically, light polarized in one direction as a result of transmission through an appropriate polarizing prism is transmitted in turn through the medium and a second polarizing prism to a light sensing means, such as a photocell or photomultiplier. The second polarizing prism is oriented so that in the absence of any input microwave signal no light is transmitted to the light sensing means. Thereafter, the Faraday rotation resulting because of the influence of an input microwave signal applied to the medium will result in a light output at the light sensitive means which is related to the microwave input signal applied to the medium.

Additionally, it is known that if a coil of wire surrounds a magnetic medium, any change in the magnetic susceptibility of the medium induces a voltage in the coil which is related to the time derivative of the change in magnetic susceptibility. This principle may be used to derive the time derivative of an input microwave signal applied to the active medium. In this regard, it may be advantageous to associate the pick-up coil with a separate magnetic element which is housed in the cavity which houses the active material.

Still another possible technique for utilizing the change in magnetic susceptibility of the medium resulting from the application of signal power thereto involves applying to the medium power of a frequency corresponding to the separation of a different pair of levels of the medium for modulation under the influence of the change in magnetic susceptibility. Thereafter, such modulated power can be abstracted. This technique is especially suited when it is desired to utilize the signal to modulate a carrier wave.

What is claimed is:

1. In combination, a paramagnetic medium whose electron spin population is characterized by at least four levels of successively higher energies $E_1$, $E_2$, $E_3$ and $E_4$, respectively, and in which the spin lattice relaxation time between one pair of alternate levels of said four levels is much shorter than the spin lattice relaxation time between the higher one of said one pair and the lower one of the remaining pair of levels of said four levels, means for applying to the medium pumping power of the frequency corresponding to the separation between one pair of adjacent energy levels of said four levels for substantially equalizing the populations of these two levels and means for applying to and abstracting from the medium power of a frequency corresponding to the separation of the remaining pair of adjacent energy levels of said four levels.

2. In combination, a crystalline medium having an active paramagnetic salt and a doping paramagnetic salt both diluted in the lattice structure of an isomorphous diamagnetic salt, the electron spin population of the active paramagnetic salt being characterized by at least four levels of successive higher energies $E_1$, $E_2$, $E_3$ and $E_4$, respectively, and the doping paramagnetic salt having an electron spin population characterized by at least two energy levels, the separation of said two energy levels of the doping paramagnetic salt corresponding to the separation between one pair of alternate levels of said four levels, whereby the spin lattice relaxation time between said one pair of alternate levels is much shorter than the spin lattice relaxation time between the higher one of said one pair and the lower one of the remaining pair of said four levels, means for applying to the crystalline medium pumping power at a frequency corresponding to the separation between one pair of adjacent levels of the active paramagnetic salt for substantially equalizing the populations of these two levels, and means for applying to and abstracting from the medium power of a frequency corresponding to the separation of the other pair of adjacent levels of the active paramagnetic salt.

3. The combination of claim 2 in which the crystalline medium is housed in a cavity resonant both at the frequency corresponding to the separation of levels $E_3$ and $E_4$ and the frequency corresponding to the separation of levels $E_1$ and $E_2$.

4. In combination, a paramagnetic medium whose electron spin population is characterized by four levels of successively higher energies $E_1$, $E_2$, $E_3$ and $E_4$, respectively, and in which the spin lattice relaxation time between levels $E_2$ and $E_4$ is much less than that between levels $E_1$ and $E_4$, means for applying to the medium pumping power of the frequency corresponding to the separation between levels $E_3$ and $E_4$ for substantially equalizing the populations of these two levels and for making the population of level $E_2$ larger than that of level $E_1$, and means for applying to and abstracting from the medium power of a frequency corresponding to the separation of levels $E_1$ and $E_2$.

5. In combination, a paramagnetic medium whose electron spin population is characterized by four levels of successively higher energies $E_1$, $E_2$, $E_3$ and $E_4$, respectively, and in which the spin lattice relaxation time between levels $E_1$ and $E_3$ is much less than that between levels $E_2$ and $E_3$, means for applying to the medium pumping power of the frequency corresponding to the separation between levels $E_3$ and $E_4$ for substantially equalizing the populations of these two levels and for making the population of level $E_2$ larger than that of level $E_1$, and means for applying to and abstracting from the medium power of a frequency corresponding to the separation of levels $E_1$ and $E_2$.

References Cited in the file of this patent

UNITED STATES PATENTS

| | | |
|---|---|---|
| 2,762,871 | Dicke | Sept. 11, 1956 |
| 2,802,944 | Norton | Aug. 13, 1957 |
| 2,825,765 | Marie | Mar. 4, 1958 |
| 2,836,722 | Dicke et al. | May 27, 1958 |

OTHER REFERENCES

Bloembergen: Physical Review, vol. 104, No. 2, Oct. 15, 1956, pages 324–327.

Feher et al.: Physical Review, vol. 105, No. 2, Jan. 15, 1957, pages 760–763.